Oct. 29, 1946.  J. A. CHURCHMAN  2,410,012
PORTABLE GRAIN ELEVATOR
Filed July 12, 1945   3 Sheets-Sheet 1

INVENTOR.
John A. Churchman
BY Victor J. Evans & Co.
ATTORNEYS

Oct. 29, 1946.  J. A. CHURCHMAN  2,410,012
PORTABLE GRAIN ELEVATOR
Filed July 12, 1945  3 Sheets-Sheet 2

INVENTOR.
John A. Churchman
BY Victor J. Evans & Co.
ATTORNEYS

Oct. 29, 1946. J. A. CHURCHMAN 2,410,012
PORTABLE GRAIN ELEVATOR
Filed July 12, 1945 3 Sheets-Sheet 3
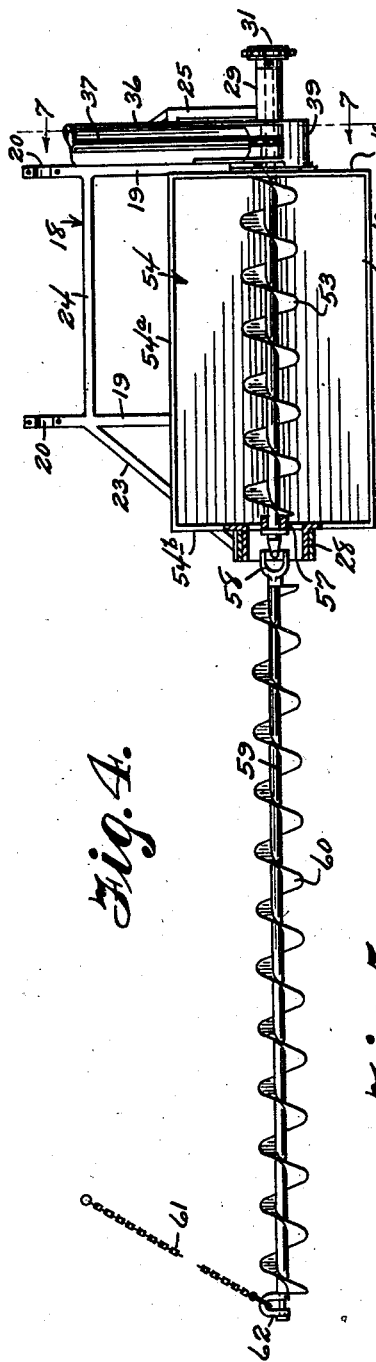
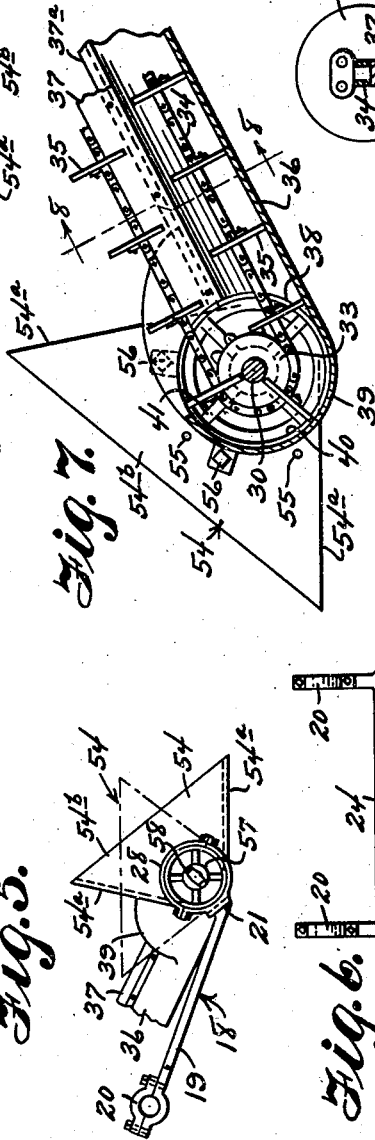
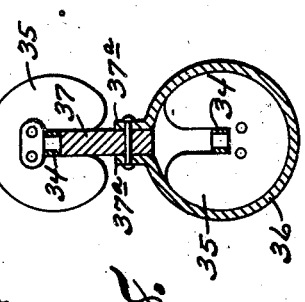
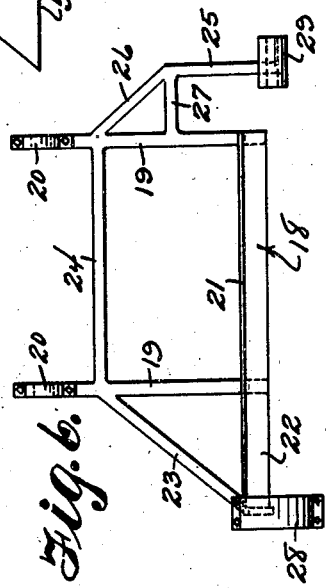
INVENTOR.
John A. Churchman
BY *Victor J. Evans & Co.*
ATTORNEYS Patented Oct. 29, 1946

2,410,012

UNITED STATES PATENT OFFICE 2,410,012

PORTABLE GRAIN ELEVATOR

John A. Churchman, Guymon, Tex.

Application July 12, 1945, Serial No. 604,555

6 Claims. (Cl. 198—7)

My present invention, in its broad aspect, has to do with improvements in grain elevators, and more particularly, it is my purpose to provide a grain elevator which is portable, and may be quickly and easily attached to any powered vehicle, tractor or trailer for transportation from place to place, and may receive its power from a connection with a rear wheel of the powered vehicle when it has been raised off of the ground, or the power take-off of the tractor on which it is mounted, or a small stationary engine mounted on the trailer in conjunction with the elevator. My present grain elevator has an auger attachment for connection with the elevator loading auger and hopper, and which is mounted for universal movement, so that it may be swung into deep bins, or out over grain piles and will feed grain to the elevator loading auger and hopper without use of hand labor or scoops, or shovels or the like. I also provide an adjustable hopper and elevator which enables my device to be used in a variety of places and to take care of all conditions in which loose grain is ordinarily found. Furthermore, to load grain from a pile, a receiving truck is simply backed into the bumper of the powered vehicle to which my elevator is attached, thereby forcing the lowered hopper into the pile and avoiding all shoveling of the loose grain. I also provide a simple and efficient means for raising and lowering the elevator and adapting the length of the spout (which is formed with telescoping sections) to the position of the receiving vehicle and the height of delivering, and my wheel for jacking up the rear wheel of the powered vehicle (as a power take-off) and means for supporting the vehicle as it is pushed backward into the grain piles since the vehicle rolls on this wheel rather than on the power wheel. My apparatus is relatively simple in construction, but is exceptionally sturdy and practical and will withstand long, hard usage, and has no fragile or intricate parts likely to become deranged or broken or otherwise inapt for use.

Other and equally important objects and advantages of my invention will be apparent from the following description and drawings, and it is pointed out that changes in form, size, shape, materials, and construction and arrangement of parts are permissible and within the purview of my broad inventive concept, and the scope of the appended claims.

In the drawings, wherein I have illustrated a preferred form of my invention:

Figure 2 is a view taken from the front of the powered vehicle carrying my elevator;

Figure 3 is a front elevation of my device and is taken looking toward the back of the powered vehicle carrying my elevator;

Figure 4 is a top plan view;

Figure 5 is an end view of the frame and bearings for attachment of the hopper, loading auger and elevator;

Figure 6 is a top plan view of the frame;

Figure 7 is a section on the line 7—7 of Figure 4 and,

Figure 8 is a section on the line 8—8 of Figure 7.

In the drawings, wherein like characters of reference are used to designate like or similar parts throughout the several views:

Figure 1:
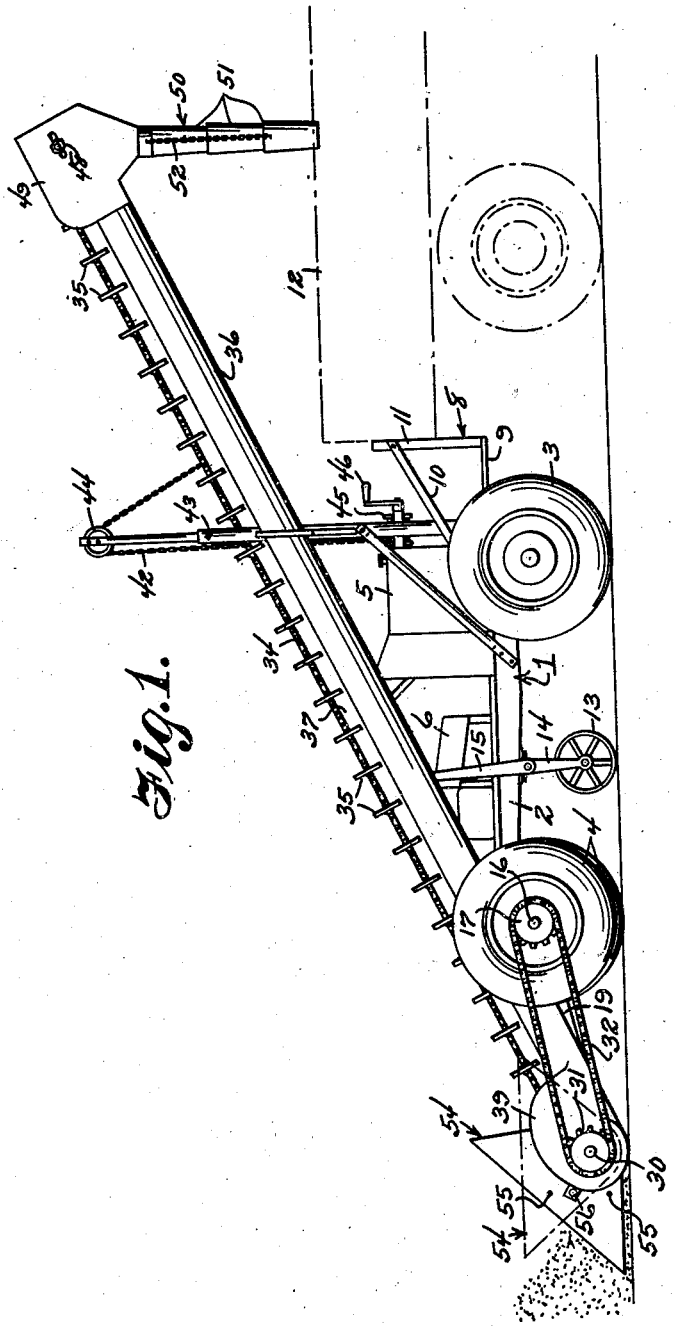
Figure 1 is a side elevation.

The numeral 1 designates any type of powered vehicle, which has a chassis 2, front wheels 3, back wheels 4, a radiator and engine hood 5, driver's seat 6, and steering wheel 7. To this powered vehicle is added a relatively strong front bumper attachment 8, comprising a horizontal support 9 and reinforcements 10 for a vertical bumper element 11 of a height to receive the impact of a backing receiving truck body 12, see dotted lines in Figure 1. Between the front and back wheels 3 and 4 and nearer the back wheels is pivotally mounted a jacking and supporting wheel 13 on a support 14 manipulated by a hand lever 15 to move the wheel down or up. When the wheel is moved down it raises the rear wheel of the powered vehicle from the ground, and also serves as a means for supporting the vehicle when the elevator is moved backward into the grain piles. The rear axle 16 of the rear wheel 4 has an extension with a power take-off gear 17 keyed thereto for driving my elevator.

In attaching my invention to the powered vehicle, the powered vehicle is backed into my apparatus, and the frame 18 of my apparatus is coupled to the rear axle 16. The frame has parallel spaced, longitudinal bars 19 carrying at their rear ends demountable couplings 20 which go about the rear axle of the powered vehicle. Attached to the front ends of the longitudinal bars is a front bar 21 which extends out from one side, as at 22, and is reinforced, as at 23. A transverse reinforcing bar 24 is provided, and a lateral extension 25—opposite to part 22—which is parallel with the longitudinal bars and is reinforced by bars 26 and 27. The frame is designed to be formed and set-up as one unit, and a coupling 28 is carried on the laterally extending part 22 of the front bar, and a bearing sleeve 29 by the lateral extension 25. Journalled through the sleeve 29 is a shaft 30 carrying a gear 31 driven by the chain drive 32 from the power take-off gear 17 on the rear axle 16 when rear wheel 4 is jacked off the ground. The shaft 30 also carries a gear 33 for an endless conveyor chain 34 on which is mounted at uniformly spaced intervals the flat, somewhat heart-shaped plates 35 which move with the endless conveyor chain up a trough like elevator tube 36 which has a top slot with a return track 37 bolted between flanges 37a for return movement of the conveyor and plates and is pivotally mounted on the shaft by a circular supporting frame 38 about which is also bent the boot 39 of the tube 38—see Figure 7. The support has circular frame parts 40 with ribs 41. The tube and conveyor belt may be raised and lowered at will by a chain hoist 42 on a sectional, extensible structure 43 on the front of the powered vehicle, and which a sheaves 44 and a drum 45, the latter of which has a crank handle 46. The standard is reinforced by angle bar 47. A gear similar to gear 33 over which the conveyor chain is trained at the top of the tube and which has a slack take-up slot mounting 48. At the upper end is an enclosure 49 leading to a sectional down spout 50, the telescoping sections 51 of which are adjusted by a chain 52. The shaft 30 carries a special conveyor loading auger 53, and about the auger is a hopper 54, which is triangular in cross-section and has diverging side plates 54a attached to end plates 54b. The plates 54b adjacent the boot 39 of the conveyor is provided with a plurality of bolt openings 55 for the selectively receiving bolts 56 to adjustably attach the same to the boot—see Figures 5 and 7—and the opposite end of the hopper has a bearing on the coupling 28 of part 22 of the frame, and also the coupling 28 supports a bearing 57 for the other end of shaft 30—see Figure 4. A universal joint 58 connects an extension shaft 59 to the shaft 30, and the extension shaft 59 carries a spiral auger 60 for transporting grain from bins, grain piles and the like, so that hand labor is unnecessary to serve the loading auger on shaft 30. A control chain 61 is attached, as at 62, to the end of extension shaft 59, and shaft 59 may be removed when not in use and a closure plate 63 attached over coupling 28. The grain elevator is operated by simply bumping the body of the receiving vehicle into the powered vehicle the hopper may be driven into a grain pile so that loading the hopper does not require hand labor, and wide areas of a large pile or bins are served by the extension auger. The hopper is ordinarily adjusted to have the lower edge about two or three inches above the ground, as in Figure 1, but it may be moved to other positions, as shown in dotted lines.

From the foregoing, it is believed that the operation and advantages of my invention will be apparent, but it is again pointed out that interpretation of the scope of my invention should only be conclusive when made in the light of the subjoined claims.

I claim:

1. A grain elevator and loader, comprising a frame adapted to be detachably connected with a powered vehicle, a shaft journalled in the frame and having a driving connection with the powered vehicle, an endless conveyor belt connected with the shaft, a tube about the belt and formed with a boot at the end connected with the shaft, said belt and tube pivotally supported to be raised and lowered, a spiral grain moving auger on the shaft serving the conveyor belt, a hopper about the shaft adjustably connected at one end to the boot of the tube and supported by the frame at the other end, an adjustable down spout on the upper end of the tube, and a shaft like extension having a spiral grain moving auger and universally and detachably connected with the first shaft.

2. The invention as defined in claim 1 wherein the conveyor belt is of the chain type and is trained over sprockets, one of which is carried by the shaft, a suitable support for the tube on the shaft, said tube having a return track, substantially heart-shaped grain conveyor blades attached at uniformly spaced intervals to the chain belt.

3. The invention as defined in claim 1 wherein the hopper is triangular in cross-section and the shaft and spiral auger are disposed through the bottom of the hopper, and wherein the hopper is adjustable to present its open top toward a grain pile to be pushed into the pile to deliver grain to the auger and conveyor.

4. The invention as defined in claim 1 wherein the frame has a mounting for the auger shaft and hopper, and the extension auger shaft extends through the mounting and has a universal connection with the first shaft to deliver grain into the hopper from extensive piles and bins.

5. The invention as defined in claim 1 wherein the frame is connected to the rear axle housing and a power take-off is provided on the rear axle, and wherein the vehicle has a rear wheel jack and a bumper.

6. The invention as defined in claim 1 wherein the frame is of unitary construction and has an end bar extending outwardly and laterally in one direction, a coupling on the extension, and wherein an extension is formed on the side of the frame opposite the first extension and is provided with a sleeve through which the shaft is journalled, and wherein the frame has detachable couplings to mount the same at the rear of the powered vehicle.

JOHN A. CHURCHMAN.